United States Patent
Speciale et al.

(10) Patent No.: US 12,175,800 B2
(45) Date of Patent: Dec. 24, 2024

(54) SYSTEM COMPRISING AN ON-BOARD UNIT FOR TELEMATIC TRAFFIC SERVICES

(71) Applicant: TELEPASS S.P.A., Rome (IT)

(72) Inventors: Emilio Speciale, Rome (IT); Fabio Francioli, Rome (IT)

(73) Assignee: TELEPASS S.P.A., Rome (IT)

( * ) Notice: Subject to any disclaimer, the term of this patent is extended or adjusted under 35 U.S.C. 154(b) by 0 days.

(21) Appl. No.: 17/624,099

(22) PCT Filed: Jul. 2, 2020

(86) PCT No.: PCT/IB2020/056246
§ 371 (c)(1),
(2) Date: Dec. 30, 2021

(87) PCT Pub. No.: WO2021/001776
PCT Pub. Date: Jan. 7, 2021

(65) Prior Publication Data
US 2022/0358793 A1  Nov. 10, 2022

(30) Foreign Application Priority Data
Jul. 3, 2019  (IT) .................. 102019000010758

(51) Int. Cl.
*G07B 15/06* (2011.01)
*B60W 50/10* (2012.01)
*B60W 50/14* (2020.01)

(52) U.S. Cl.
CPC ........... *G07B 15/063* (2013.01); *B60W 50/10* (2013.01); *B60W 50/14* (2013.01); *B60W 2050/146* (2013.01); *B60W 2540/21* (2020.02)

(58) Field of Classification Search
CPC ..... G07B 15/063; B60W 50/10; B60W 50/14; B60W 2050/146; B60W 2540/21
See application file for complete search history.

(56) References Cited

U.S. PATENT DOCUMENTS

| 9,607,449 | B1* | 3/2017 | Chen | G07C 5/008 |
| 2002/0091493 | A1* | 7/2002 | Christopher | G05B 9/02 |
| | | | | 702/113 |

(Continued)

FOREIGN PATENT DOCUMENTS

| BR | 102012000225 A2 * | 8/2018 | G08G 1/00 |
| DE | 10 2012 215734 | 3/2014 | |
| EP | 3238182 | 11/2017 | |

OTHER PUBLICATIONS

Sampino, "Rastreador de Veiculo Automotivo,," Aug. 14, 2018 (date published), English translation of Brazilian Patent BR201200225A2, p. 1, [007] (Year: 2018).*

(Continued)

*Primary Examiner* — Nabil H Syed
*Assistant Examiner* — Cal J Eustaquio
(74) *Attorney, Agent, or Firm* — NIXON & VANDERHYE P.C.

(57) ABSTRACT

A system comprising an on-board unit (OBU) for a telematic traffic service, for example an automatic toll collection service, and a software application which can be executed by an external user device, for example a smartphone, is described. The OBU comprises both a radiofrequency communication module for communicating with the road-side units (RSU) of the telematic traffic service and a proximity communications module (for example Bluetooth) for communicating with the external user device. The data processing unit of the OBU executes software applications which support the telematic traffic service and additional services. The software application executed by the external user device provides the user, via the user interface of the external user device and the proximity communications module of the OBU, with access to the telematic traffic service and to the additional services supported by the OBU.

19 Claims, 4 Drawing Sheets

(56) References Cited

U.S. PATENT DOCUMENTS

| | | | | |
|---|---|---|---|---|
| 2003/0037427 A1* | 2/2003 | Chernoff | ................ | B60N 2/90 |
| | | | | 29/428 |
| 2004/0004120 A1* | 1/2004 | Kojima | ................ | G08G 1/015 |
| | | | | 235/384 |
| 2005/0038581 A1 | 2/2005 | Kapolka et al. | | |
| 2006/0199550 A1* | 9/2006 | Ishikawa | ................ | H04B 1/40 |
| | | | | 455/84 |
| 2006/0290326 A1* | 12/2006 | Bhesania | ................ | G05F 1/70 |
| | | | | 323/210 |
| 2008/0128186 A1 | 6/2008 | Fernandez | | |
| 2008/0162968 A1* | 7/2008 | Breen | ................ | G06F 1/3203 |
| | | | | 713/323 |
| 2011/0208568 A1* | 8/2011 | Deitiker | .............. | G07B 15/063 |
| | | | | 705/13 |
| 2012/0215403 A1* | 8/2012 | Tengler | ................ | B60K 35/00 |
| | | | | 701/36 |
| 2016/0180604 A1* | 6/2016 | Wilson | ................ | G06Q 40/08 |
| | | | | 705/4 |
| 2019/0012657 A1* | 1/2019 | Geist | ..................... | G07B 15/00 |

OTHER PUBLICATIONS

International Search Report for PCT/IB2020/056246, mailed Oct. 13, 2020, 4 pages.

Written Opinion of the ISA for PCT/IB2020/056246, mailed Oct. 13, 2020, 8 pages.

* cited by examiner

SYSTEM COMPRISING AN ON-BOARD UNIT FOR TELEMATIC TRAFFIC SERVICES

This application is the U.S. national phase of International Application No. PCT/IB2020/056246 filed 2 Jul. 2020, which designated the U.S. and claims priority to IT patent application No. 102019000010758 filed 3 Jul. 2019, the entire contents of each of which are hereby incorporated by reference.

TECHNICAL SECTOR

The present invention relates in general to the field of telematic traffic services. In particular, the present invention relates to a system comprising an on-board unit for telematic traffic services.

PRIOR ART

Systems which support telematic traffic services are known. These services comprise both services for the user (for example automatic toll collection, namely the payment of tolls for access to roads or motorways, payment of carparks, etc.) and services for the providers and authorities (for example control over the access to restricted traffic zones, monitoring of road or motorway traffic, etc.).

These systems comprise an on-board unit (abbreviated OBU) suitable for being installed on-board a vehicle and a plurality of road side devices or units (abbreviated RSU) which are installed along the road side or on the access gantries of the toll roads or motorways, carparks or restricted traffic zones.

An OBU generally comprises a radiofrequency communication module (for example a DRSC, Dedicated Short Range Communication, module) for communication with the RSU, a processor, a memory and a battery.

Some known OBUs are also provided with an interface for interaction with the user, typically in the form of a display or one or more pushbuttons. By means of the display the OBU may provide the user with information such as the amount paid for transit along a certain road section. By means of the pushbuttons the user may instead issue commands to the OBU, such as configuration commands for entering the number of axles and the weight class of the vehicle.

SUMMARY OF THE INVENTION

The Applicant has noted that the known OBUs have a number of drawbacks.

Firstly, the displays of the known OBUs are generally very small and therefore are able to provide the user only with short text messages. The small dimensions of the display moreover make reading of this information not very easy for the user.

As for the issuing of commands to the OBU, the use of the pushbuttons allows only a small number of simple commands to be given. Furthermore, the use of the pushbuttons may be awkward and inconvenient, in particular if the position of the OBU in the vehicle is not close to the driving seat.

On the other hand, there is need to keep the cost of the OBU as low as possible. Providing an OBU with a more complex user interface which facilitates the interaction with the user (for example a bigger display and/or input means which are more sophisticated than pushbuttons) could disadvantageously increase the cost thereof in an undesirable manner.

The object of the present invention is therefore to provide a system comprising an on-board unit for a telematic traffic service, which solves one or more of the aforementioned problems.

In particular, an object of the present invention is to provide a system comprising an on-board unit for a telematic traffic service which allows the user to interact with the on-board unit in a simple, efficient and convenient manner, without however increasing the cost of the on-board unit.

According to embodiments of the present invention, this object is achieved by a system comprising an on-board unit for providing a telematic traffic service and a software application executable by an external user device provided with a user interface (for example, a smartphone or tablet with touchscreen). The on-board unit comprises a data processing unit which executes a software application for providing the telematic traffic service and one or more software applications for providing services additional to the telematic traffic service. The on-board unit also comprises a radiofrequency communication module for communication with one or more road-side devices which support the provision of the telematic traffic service and a proximity communications module for communication with the external user device. The software application executed by the external user device is configured to provide a user, via the user interface of the external user device and the proximity communications module of the on-board unit, with access to the services additional to the telematic traffic service supported by the on-board unit.

In the present description and in the claims, the expression "additional services" will indicate services, the implementation or supplying of which (also) involves the use of resources other than the radiofrequency connection between on-board unit and road-side devices which support the telematic traffic service, such as for example a mobile connection between on-board unit and remote apparatus of third parties (namely of parties other than the provider of the telematic traffic service), a mobile connection between on-board unit and remote apparatus which provide digital assistant functions, or a wearable device which provides data about the health condition of the user.

Therefore, advantageously, owing to the software application executed by the external user device and the proximity communications module, the user interface of the external user device basically acts as a user interface of the on-board unit. This allows advantageously the user to interact in a more efficient and easy manner with the on-board unit, in particular in order to take advantage of the additional services, essentially without resulting in any increase in the cost of the on-board unit itself.

The user may in fact interact with (namely receive information from and issue commands to) the on-board unit via the interface of his/her user device, such as a personal smartphone or tablet. These devices are typically provided with relatively large size screens so as to be able to present contents of various types (not only text) and of a certain complexity. They also have means for inputting information and commands (typically via a touchscreen) which are extremely simple to use and familiar for the user. The user may thus issue to the on-board unit a wide range of commands via the user interface of his/her personal device, in a simple and easy manner, irrespective as to the position of the on-board unit inside the vehicle. Moreover, the user may receive from the on-board unit complex information and display it on the user interface of his/her user device in a format (size and form) which may be immediately read.

On the other hand, the fact of not having to provide the on-board unit with any user interface of its own (display, etc.) advantageously allows the cost and dimensions thereof to be kept low/small and the reliability thereof to be increased.

According to an aspect the present invention, a system comprising an on-board unit for providing a telematic traffic service and a software application executable by an external user device provided with a user interface is provided,
wherein the on-board unit comprises:
  a data processing unit which executes a first software application for providing the telematic traffic service and at least a second software application for providing at least one service additional to the telematic traffic service;
  a radiofrequency communication module suitable for communicating with at least one road-side device of a system suitable for providing the telematic traffic service; and
  a proximity communications module suitable for communicating with the external user device,
wherein the software application is configured to provide a user of the external user device, via the user interface and the proximity communications module, with access to the at least one service additional to the telematic traffic service provided by said at least one second software application.

Preferably, the on-board unit also comprises an audio module comprising at least one microphone and at least one speaker, the on-board unit being configured to receive at least one voice command via the at least one microphone and to provide information via the speaker, the audio module being suitable for being activated upon detection of a predefined vocal expression.

Preferably, the on-board unit is also provided with mobile connectivity for connection to at least one remote apparatus suitable for supporting the provision of the telematic traffic service, or of a digital assistant function, or of the at least one service additional to the telematic traffic service.

Preferably, the on-board unit also comprises a power supply circuit, in turn comprising:
  a battery suitable for providing a predefined supply voltage;
  an external power supply unit configured to receive an external power supply voltage via a port of the on-board unit, the external power supply unit being configured to convert the external power supply voltage into the predefined supply voltage; and
  a power supply management unit configured to manage the use of the battery and the external power supply unit for supplying the on-board unit and to manage the recharging of the battery.

Preferably, the power supply circuit further comprises a solar panel configured to recharge the battery.

Preferably, the on-board unit further comprises a geolocation engine suitable for determining the geographical position of the on-board unit by interacting with one or more satellite geolocation systems.

Preferably, the on-board unit further comprises one or more light indicators suitable for providing indications to the user of the on-board unit.

Preferably, the on-board unit further comprises a low frequency communications module.

Preferably, the on-board unit further comprises one or more pushbuttons for allowing the user to issue at least one command to said on-board unit, the one or more pushbuttons comprising at least one service button adapted to activate the proximity communications module so that it connects to the external user device.

Preferably, the on-board unit is a portable device removably fixable inside a vehicle.

Preferably, the on-board unit comprises an external housing, the external housing having a width of between 80 mm and 100 mm, a height of between 60 mm and 70 mm and a thickness of between 20 mm and 30 mm.

Preferably, the proximity communications module is provided with a real-time operating system.

Preferably, the software application is also configured to provide the user of the external user device with information relating to the functional state of the on-board unit via the user interface of the external user device.

BRIEF DESCRIPTION OF THE DRAWINGS

The present invention will become clearer from the following detailed description, given by way of a non-limiting example, to be read with reference to the accompanying drawings, in which.

DETAILED DESCRIPTION OF PREFERRED EMBODIMENTS

A system according to an embodiment of the present invention preferably comprises an on-board unit 1 (shown in FIG. 1) and a software application suitable for execution by an external user device 5 and suitable for supporting the interaction of the user of the device 5 with the on-board unit 1.

Figure 1:
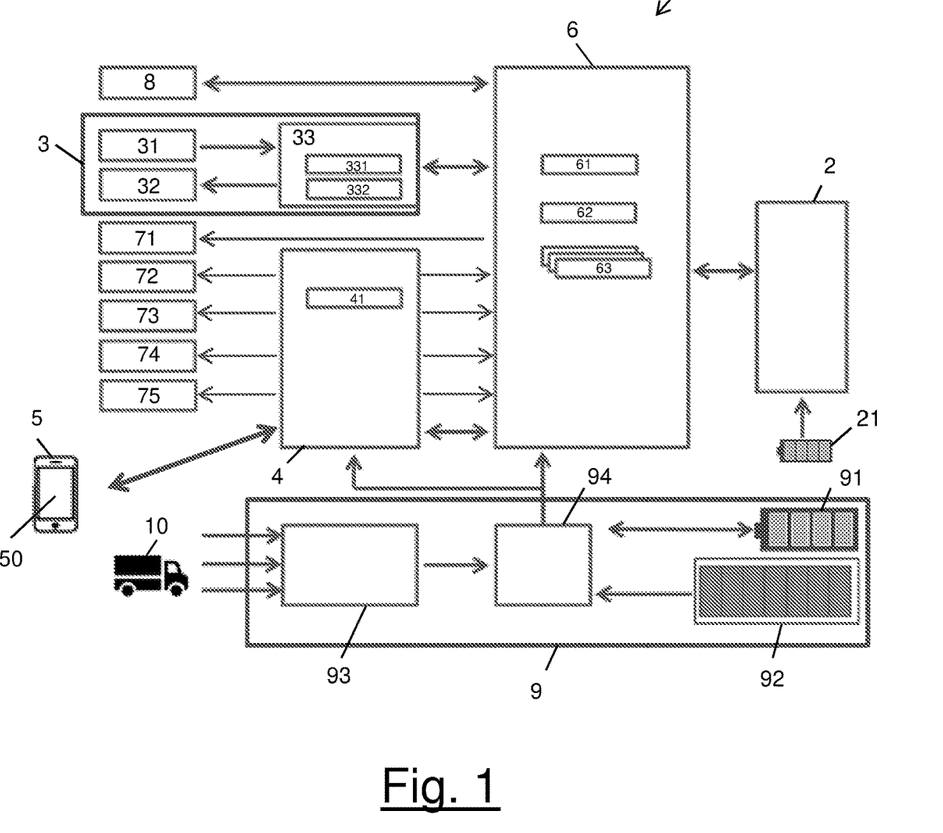
FIG. 1 is a block diagram of an on-board unit according to an embodiment of the present invention.

The on-board unit 1 is a portable device which is removably fixable inside a vehicle 10 (for example to the windscreen thereof). The user may for example purchase the on-board unit 1 and fix it to the windscreen of his/her vehicle 10, for example using adhesive. The vehicle 10 may be a private vehicle such as a motor car, or a public vehicle. The vehicle 10 may form part of a fleet of vehicles, for example a lorry, articulated truck or commercial vehicles.

The on-board unit 1 is suitable for providing a telematic traffic service such as, for example, automatic toll collection, payment of carparks, control over the access to restricted traffic zones, monitoring of the traffic on roads or motorways, etc. In the continuation of the present description, by way of a non-limiting example, it is assumed that the on-board unit 1 is suitable for providing an automatic toll collection service.

As shown in FIG. 1, the on-board unit 1 preferably comprises a radiofrequency communication module 2 suitable for communicating with a set of road-side devices (RSU) which support the automatic toll collection service. The radiofrequency communication module 2 preferably is a DSRC (Dedicated Short Range Communication) module. The radiofrequency communication module 2 is preferably provided with its own battery 21 which ensures the operation thereof even when the power supply circuit of the unit 1 (which will be described in greater detail hereinbelow) does not function.

The on-board unit 1 preferably also comprises an audio module 3 for allowing the audio interaction with the user of the on-board unit 1. The audio module 3 in particular comprises at least one microphone 31, preferably two microphones 31, which allow voice commands to be received from the user. Preferably, the audio module 3 also comprises at least one speaker 32 which allows information in audio format to be supplied to the user. The audio module 3 also comprises an audio interface 33 in turn comprising a codec 331 and an amplifier 332.

In order to allow interaction between the on-board unit 1 and the user device 5, the proximity communications module 4 is preferably provided with a real-time operating system 41, namely a specialized operating system for supporting real-time software applications. This real-time operating system 21 may be for example Mbed OS, ITRON (The Real-time Operating system Nucleus) OS, ThreadX OS or FreeRTOS.

The on-board unit 1 preferably also comprises a proximity communications module 4 for communication with the user device 5 external to the on-board unit 1. The proximity communications module 4 preferably is based on a radiofrequency technology with a maximum coverage range of a few tens of centimetres, so that the on-board unit 1 is able to communicate with the user device 5 only when both of them are situated inside the same vehicle. For example, the proximity communications module 4 may be a Bluetooth module, in particular a low-energy Bluetooth module (BLE, Bluetooth Low Energy). Optionally, an encryption mechanism may be provided for guaranteeing the security of the communication between the proximity communications module 4 and the external user device 5.

The external user device 5 is preferably provided with a user interface 50. For example, the external user device 5 may be a smartphone or a table provided with a screen or touchscreen. In order to be able to communicate with the on-board unit 1, the user device 5 is preferably provided with a proximity communications module (not shown in FIG. 1) similar to that included in the on-board unit 1.

The on-board unit 1 is also preferably provided with a data processing unit 6. The data processing unit 6 preferably cooperates with the radiofrequency communication module 2, the audio module 3 and the proximity communications module 4 in order to manage and control the operation of the on-board unit 1. The data processing unit 6 is preferably provided with an operating system 61 such as, by way of a non-limiting example, Linux, Android or QNX.

The data processing unit 6 is moreover preferably provided with mobile connectivity (in particular 4G connectivity) for connection—by means of a mobile network—to remote apparatus such as:
- centralized apparatus of the system providing the automatic toll collection service;
- remote systems which provide digital assistant functions, such as Google Assistant™, Alexa™ or Siri™;
- remote systems, optionally also of third parties (i.e. parties other than the provider of the automatic toll collection service) who provide services additional to the automatic toll collection service.

The data processing unit 6 is also preferably provided with a geolocation engine 62 suitable for determining the geographical position of the on-board unit 1 by interacting with one or more satellite geolocation systems (for example GPS and/or GLONASS and/or Galileo).

The data processing unit 6 is moreover preferably suitable for executing one or more applications 63 for providing the automatic toll collection service and additional services, as will be explained in greater detail hereinbelow.

The on-board unit 1 optionally is provided with one or more additional components, such as:
- one or more light indicators 71. For example, two or more differently coloured LEDs may be provided, these being used by the data processing unit 6 to provide certain information to the user of the unit 1;
- one or more sensors 72, for example an accelerometer, for supporting additional services such as a virtual key, auto-calibration (where auto-calibration is understood as meaning the capacity of the unit 1 to calculate, during the first operating stages following installation, the rotary-translational matrix for calculating the components of the acceleration vectors along the axes x,y,z of the terrestrial reference system with respect to a reference system x1, y1, z1 associated with the position of the on-board unit 1, which may be mounted in a position not necessarily coplanar with the terrestrial system), crash detection, anti-theft or GPS fraud detection (for example alteration of the GPS signal by means of transmitters which invalidate the signal from the satellite geolocation systems);
- a low frequency (<GHz) communication module 73 for supporting additional services such as, for example, the opening of electric gates, the reading of any sensors present on-board the vehicle 10 (for example tyre pressure sensors), opening of the doors and boot of the vehicle 10, etc.;
- one or more pushbuttons for allowing the user to issue some commands to the on-board unit 1 such as a service button 74 for activating the proximity communications module 4 and SET audio button 75.

The on-board unit 1 is also preferably provided with a data/power supply port 8 such as a USB port.

Figure 2:
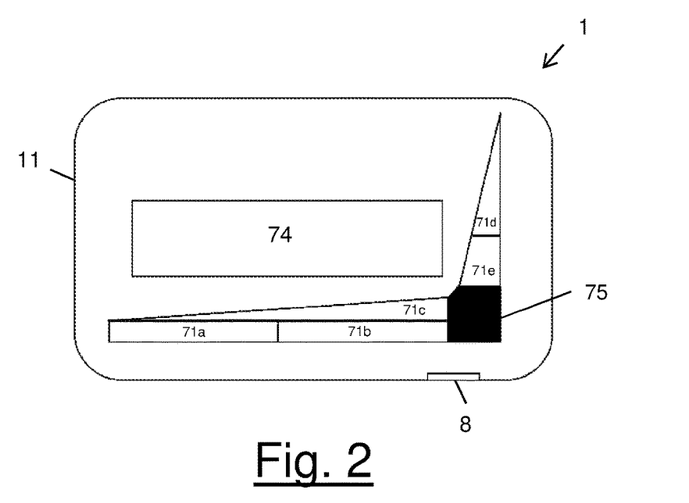
FIG. 2 is a front view of the on-board unit according to an embodiment of the present invention.

FIG. 2 shows a front view of an on-board unit 1 according to an embodiment of the present invention. The on-board unit 1 comprises a housing 11 inside which the aforementioned components are housed. The housing 11 preferably has a width of between 80 mm and 100 mm (for example, 90 mm), a height of between 60 mm and 70 mm (for example, 64 mm) and a thickness of between 20 mm and 30 mm (for example, 26 mm). Four LEDs 71a, 71b, 71c, 71d, 71d, the service button 74 and the SET audio button 75 are visible on the front surface of the housing.

The data/power supply port 8 is also visible in the bottom part.

Considering again FIG. 1, the on-board unit 1 preferably also comprises a power supply circuit 9. The power supply circuit 9 preferably has both a function of providing an internal low voltage power supply for the unit 1 and a function of filtering and stabilizing an external power supply received via the data/power supply port 8.

In particular, the power supply circuit 9 preferably comprises a battery 91 for supplying the components of the on-board unit 1, in particular the proximity communication module 4 and the data processing unit 6. The battery 91 preferably provides a predefined supply voltage. The predefined supply voltage is preferably a low voltage. For example, the predefined supply voltage may be 5 V.

Optionally, the power supply circuit 9 may also comprise a solar panel 92. The solar panel 92 advantageously allows the battery 91 to be recharged during the daytime hours. In this way the operational autonomy of the on-board unit 1 is advantageously prolonged.

The power supply circuit 9 preferably also comprises an external power supply unit 93 configured to receive power from an external source via the data/power supply port 8. In particular, the external power supply unit 93 is preferably configured to convey the stabilized power supply to the input of the on-board unit 1. In this way, advantageously, a reduction in the overall dimensions of the on-board unit 1 is obtained, owing to the presence of elements for filtering the transient disturbances which are typical of the external power supply from a vehicle. The external power supply depends on the type of external source, which may be the same vehicle 10 on-board which the on-board unit 1 is installed or a commercial power supply unit (for example battery charger for a smartphone). In particular, the on-board unit 1 may be powered in three different alternative configurations, i.e.:

- fixed installation: the on-board unit 1 is connected via a USB cable and adapter to the CAN bus of the vehicle 10;
- fixed installation with DIN (Digital Interface Board): the on-board unit 1 is connected by means of a USB cable to a DIB, in turn connected to the CAN bus of the vehicle 10; and
- mobile installation: the on-board unit 1 is connected via a USB cable to a mobile external power supply source, for example a battery charger.

The fixed installation with DIB may for example be used when the user wishes to make use of some additional services supported by the on-board unit 1, such as remotely downloading the tachograph data, or downloading data for checking compliance with the existing regulations regarding the number of driving hours, stoppage and rest time, or storing said data.

In any case, the external power supply voltage is typically 12V or 24V. The external power supply unit 93 is preferably configured to convert this external power supply voltage of 12V or 24V into the same power supply voltage internally provided by the battery 91, for example 5V.

The power supply circuit 9 further preferably comprises a power supply management unit 94, arranged between battery 91, solar panel 92 and external power supply unit 93, on the one hand, and components 4 and 6 to be powered, on the other hand. The power supply management unit 94 is preferably configured to manage the various power supply sources of the on-board unit 1 and recharging of the battery 91.

As described above, the software application executed by the external user device 5 supports the interaction with the on-board unit 1. This software application preferably is configured so as to implement one or more of the following functions:

- provide the user with information relating to the functional state of the on-board unit 1 via the user interface 50 of the user device 5, where the possible functional states of the on-board unit 1 are as follows:
  - not powered,
  - powered NO GO, i.e. the on-board unit 1 is powered but the contractual state in a given toll collection domain is not in order, or there are malfunctions which do not allow compliance with the rules of the toll collection domain where it is situated;
  - powered GO, i.e. the on-board unit 1 is powered and the contractual and technical/functional state of the on-board unit 1 are in order for providing the automatic toll collection service in the toll collection domain where it is situated;
  - powered don't care, i.e. the on-board unit 1 is powered, but there is a fault which prevents operation thereof;
  - GSM OK, i.e. mobile connectivity present;
  - GSM KO, i.e. mobile connectivity absent;
  - GSM being acquired, i.e. searching for mobile connectivity;
  - GPS fix, i.e. satellite geolocation signal detected;
  - GPS no fix, i.e. satellite geolocation signal not detected;
  - GPS being acquired, i.e. searching for satellite geolocation signal;
  - general error.
- provide the user with the possibility of reading and/or writing the configuration data of the on-board unit 1 for the automatic toll collection service (e.g. number of axles of the vehicle and weight class of the vehicle); and
- provide the user with access to the additional services offered by the on-board unit 1.

If the vehicle 10 forms part of a fleet which depends on a certain operator, the operator may also be provided with a software application which allows them to access remotely the on-board unit 1 by means of its mobile connectivity, for example in order to read and/or write the corresponding configuration data of the automatic toll collection service.

Advantageously, owing to the software application and the proximity communications module 4, the user interface 50 of the external user device 5 basically acts as a user interface 50 of the on-board unit 1. This advantageously allows the user to interact more efficiently and easily with the on-board unit 1, essentially without resulting in any increase in the cost of the on-board unit 1 itself.

The user may in fact interact with (namely receive information from and issue commands to) the on-board unit 1 via the interface of his/her user device 5, such as his personal smartphone or tablet. These devices are typically provided with relatively large size screens able to present contents of various types (not only text) and of a certain complexity. They also offer ways for inputting information and commands (typically via a touchscreen) which are extremely easy to use and familiar for the user. The user may thus issue to the on-board unit 1 a wide range of commands via the user interface 50 of his/her personal device, in a simple-to-use and easy manner, irrespective as to the position of the on-board unit inside the vehicle. Moreover, the user may receive from the on-board unit 1 complex information and display it on the user interface 50 of his/her user device 5 in a format (size and form) which may be immediately read.

On the other hand, the fact of not having to provide the on-board unit 1 essentially with any associated user interface (display, etc.) advantageously allows the cost, the dimensions and risk of faults to be limited.

In addition to the use of the user interface 50 of the user device 5, the user may interact with the on-board unit 1 also by vocal means, via the audio module 3. In particular, via the microphone 31, the user may issue to the on-board unit 1 voice commands. Optionally, again via the audio module 3, the user may also interact with digital assistants (for example Google Assistant™, Alexa™ or Siri™) and access the additional services provided by third parties (namely parties other than the provider of the automatic toll collection service). The audio module 3 may optionally interact with the multimedia system of the vehicle 10 (for example by means of the proximity communication module 4) so that the speakers thereof may be used to provide information to the user in the form of voice messages. The audio module 3 may for example be configured to detect the voice print of the user for the authorization of payments (for example carparking or fuel payments).

In addition to the external user device 5, the proximity communications module 4 may allow communication of the on-board unit 1 with other external devices, for example a wearable device such as a smart watch. This allows the on-board unit 1 to implement further additional services. For example, by means of the data received from the wearable device it is possible to provide a service for monitoring the health condition of the user while he/she is driving or a service for monitoring fatigue (fatigue detection service). If the vehicle 10 forms part of a fleet which depends on a certain operator, the operator may be alerted by the on-board unit 1 that the user has been affected by a sudden illness or sleepiness, as will be described in greater detail hereinbelow.

Some examples of interaction between the user and the on-board unit 1 are described below.

Figure 3:
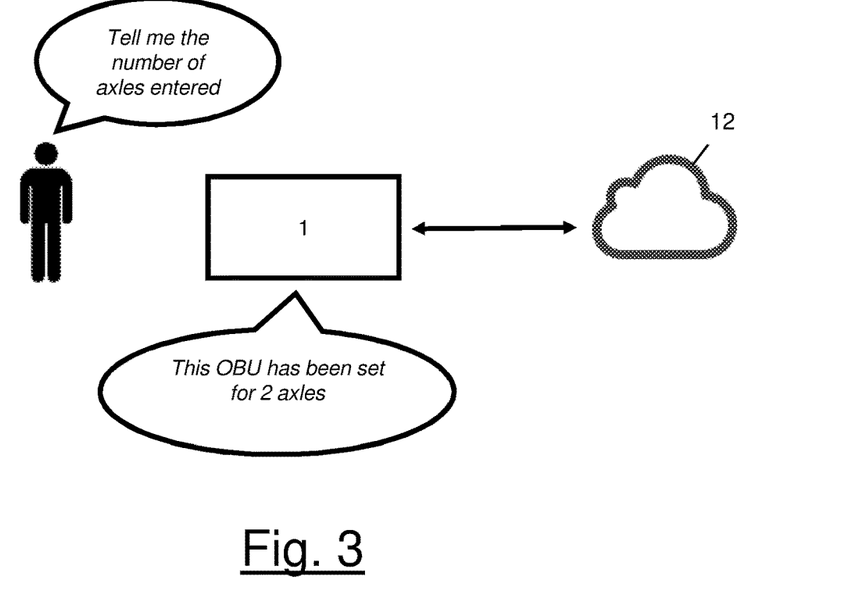
FIGS. 3, 4, 5 and 6 show three cases of examples of use of the system according to embodiments of the present invention.

A first example, shown schematically in FIG. 3, refers to the case where the user wishes to receive information from the on-board unit 1 (read operation), for example wishes to know the number of axles used for configuration of the automatic toll collection service on the on-board unit 1.

For this purpose, the user may directly use the audio module 3 of the on-board unit 1 (i.e. the microphone 31), by entering a voice command such as "Tell me the number of axles entered". The command may be preceded by an activation command in the form of a predefined word or expression, for example "anyword+Telepass" or "Telepass+anyword" (for example "OK Telepass") which triggers activation of the audio module 3.

The voice command is encoded into a stream of digital data by the codec 331 of the audio module 3 which the data processing unit 6 then sends via its mobile connectivity to a remote system which provides digital assistant services (e.g. Google Assistant™, Alexa™ or Siri™). The system processes the digital stream corresponding to the voice command and generates a corresponding instruction for the on-board unit 1. The instruction in this case will be an instruction for reading the number of axles set by the memory of the on-board unit 1. The on-board unit 1 receives the instruction from the remote system and its data processing unit 6 executes it. By means of its mobile connectivity, the on-board unit 1 then sends the information recovered during execution of the instruction to the remote system which, on the basis of said information, generates a digital data stream corresponding to the vocal response to be given to the user. This digital data stream is received by the data processing unit 6 via its mobile connectivity and forwarded to the audio module 3 which, via the codec 331, converts it into a response such as "This OBU has been set for 2 axles" which is finally output by the speaker of the audio module 3 (or by the speakers of the multimedia system of the vehicle 10 to which the audio module 3 may be connected).

According to a variant, the voice command encoded by the codec 331 could be managed locally by the on-board unit 1, in particular by one of the software applications 63. In this case, the software application 63 generates locally the instruction for reading the number of axles and, once this has been performed, generates the digital data stream corresponding to the vocal response to be given to the user which finally is output via the speaker of the audio module 3 (or by speakers of the multimedia system of the vehicle 10 to which the audio module 3 may be connected).

Although the above example relates to the number of axles, it may also apply to the case where the user wishes to know other information relating to the configuration of the on-board unit 1 in connection with the automatic toll collection service (for example weight class of the vehicle, toll collection service domain(s) which have been configured, etc.).

Similar considerations apply to the services additional to the automatic toll collection service. For example, in the case where the vehicle 10 forms part of a fleet, using procedures similar to the reading of configuration data of the automatic toll collection service described above, the user may request vocally information about an assignment, namely instructions by the fleet operator regarding the transport service which must be performed (assignment destination, passage through any intermediate check-points, etc.). This assignment information, which is obtained by the on-board unit 1 via its mobile connectivity, may be then supplied to the user in audio form via the speaker of the audio module 3 of the on-board unit 1 (or via the speakers of the multimedia system of the vehicle 10 to which the audio module 3 may be connected).

Figure 4:
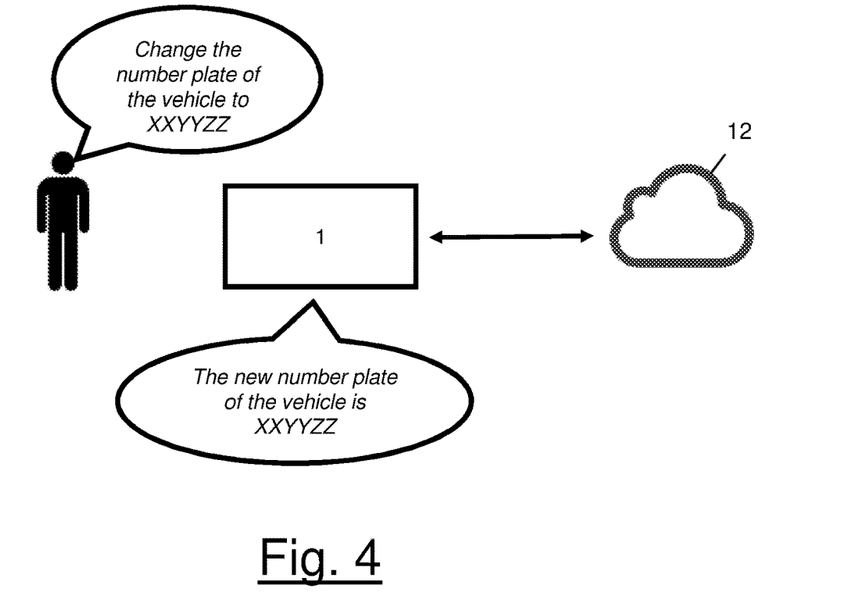

A second example, shown schematically in FIG. 4, refers to the case where the user wishes to change or enter information about the on-board unit 1 (write operation), for example wishes to change the number plate of the vehicle used for configuration of the automatic toll collection service on the on-board unit 1.

For this purpose, the user may in this case also use directly the audio module 3 of the on-board unit 1 (i.e. the microphone 31), by entering a voice command such as "Change the number plate of the vehicle to XXYYZZ". The command may be optionally preceded by an activation command in the form of a predefined word or expression, for example of the type "anyword+Telepass" or "Telepass+anyword" (for example "OK Telepass") which is recognized locally by the on-board unit 1 and triggers activation of the audio module 3.

The voice command is encoded into a stream of digital data by the codec 331 of the audio module 3 which the data processing unit 6 then sends via its mobile connectivity to a remote system which provides digital assistant services (e.g. Google Assistant™, Alexa™ or Siri™). The system processes the digital stream corresponding to the voice command and generates a corresponding instruction for the on-board unit 1. The instruction in this case will be an instruction for writing the new number plate XXYYZZ in the memory of the on-board unit 1. The on-board unit 1 receives the instruction from the remote system and its processing unit 6 executes it. The on-board unit 1 then sends a confirmation as to the successful outcome of execution of the instruction via its associated mobile connectivity to the remote system which, on the basis thereof, generates a digital data stream corresponding to the vocal response to be given to the user. This digital data stream is received by the data processing unit 6 via its mobile connectivity and forwarded to the audio module 3 which, via the codec 331, converts it into a response such as "The new number plate of the vehicle is XXYYZZ" which is finally output by the speaker of the audio module 3 (or by the speakers of the multimedia system of the vehicle 10 to which the audio module 3 may be connected).

According to a variant, the voice command encoded by the codec 331 could be managed locally by the on-board unit 1, in particular by one of the software applications 63. In this case, the software application 63 generates the instruction for writing the new number plate XXYYZZ and, once this has been performed, generates the digital data stream corresponding to the vocal response to be given to the user, which finally is output by the speaker of the audio module 3 (or by speakers of the multimedia system of the vehicle 10 to which the audio module 3 may be connected).

Although the above example relates to the number plate of the vehicle, it may also apply to the case where the user wishes to modify or enter other information relating to the configuration of the automatic toll collection service on the on-board unit 1, such as the toll collection service domain(s) configured for the associated user profile, number of axles of the vehicle, weight class of the vehicle, Euro class, number of trailers, etc.).

Similar considerations apply to the services additional to the automatic toll collection service. For example, in the case where the vehicle 10 forms part of a fleet, using procedures similar to the modification of the configuration data of the automatic toll collection service described above, the user may provide in vocal form assignment information to the fleet operator, for example regarding the outcome of the assignment. This assignment information, received by the on-board unit 1 via the microphone of the audio module 3, may then be provided by the on-board unit 1 to the fleet operator via mobile connectivity.

Figure 5:
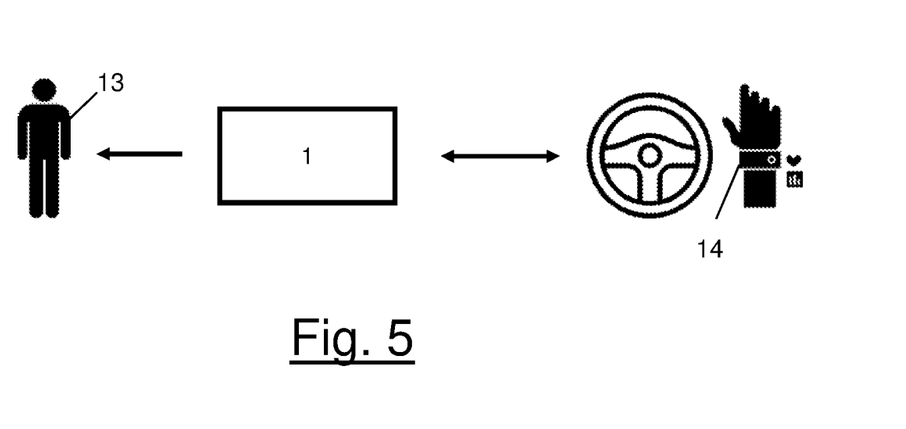

The on-board unit 1 may also advantageously provide vocal feedback via the speaker of the audio module 3 (or the speakers of the multimedia system of the vehicle 10 to which the audio module 3 may be connected) also in the following cases:
- detection of the fact that the user profile is not suitable for the use of a given toll collection service domain (in this case the signal may also be provided by means of one of the LEDs 71);
- detection of the fact that the on-board unit 1 and the external device 5 are correctly associated by means of the proximity communications module 4;
- implementation of a new additional service in the on-board unit 1;
- disconnection/connection of the power supply cable from/to the data/power supply port 8;
- incorrect fixed installation of the on-board unit 1;
- recognition of the DIB (Digital Interface Board) for supplying the on-board unit 1 by means of the CAN bus of the vehicle 10;

FIG. 5 shows an example where the vehicle 10 forms part of a fleet, the operator of which (indicated by the reference number 13 in FIG. 5) has a software application which allows them to monitor the health condition of the drivers of the fleet vehicles. The user—who is the driver of one of the vehicles in the fleet—in this case preferably has a wearable device 14 designed to monitor his/her health condition (for example detect the heart beat) and communicate with the proximity communications module 4 of the on-board unit 1. The wearable device 14 sends to the on-board unit 1 samples for example of the user's heart beat, via the proximity communications module 4. The on-board unit 1 preferably sends these samples via its mobile connectivity to a remote system (not shown in the Figure) which provides a service for monitoring the health condition on the basis of the heart beat. In the event of anomalous conditions, the remote system may for example send an alarm to the on-board unit 1, which in turn forwards the alarm signal to the operator via its mobile connectivity.

Figure 6:
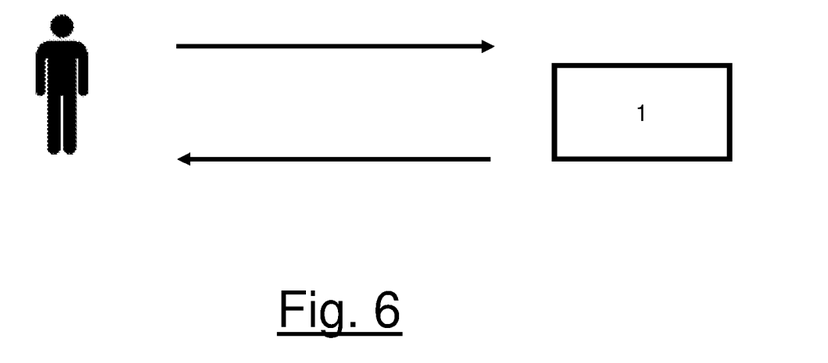

FIG. 6 shows an example where the user uses the software application of the user device 5 to access a surveillance service supported by the on-board device 1 such that, when the vehicle 10 moves, the on-board unit 1 alerts the user via the user interface 50 of the user device 5.

In particular, via the user interface 50, the user activates the surveillance service on the on-board unit 1. When this service has been activated, the on-board unit 1 monitors its own geographical position by means of its geolocation engine 62. When it detects a change in its position, the on-board unit 1 preferably sends an alarm signal to the user device 5 via its mobile connectivity (it is assumed that the user is not located on-board the vehicle 10, but at a certain distance from it, and therefore his/her user device 5 will not be associated with the on-board unit 1 via the proximity communications module 4). The software application of the user device 5 preferably sends the alarm signal to the user via its user interface 50. The same alarm signal may be optionally sent from the on-board unit 1 via its mobile connectivity also to other parties, for example the fleet operator, if present. By means of its mobile connectivity, the onboard unit 1 also preferably sends an alarm signal to a remote system (not shown in FIG. 3) which manages the surveillance service. This remote system preferably sends periodically a check and confirm command to the on-board unit 1 via which it asks the on-board unit 1 to detect its geographical position and send it to the remote system. If there is no response to one or more of these periodic commands, the remote system preferably sends a new alarm signal to the user device 5 via mobile connectivity.

Figure 7:
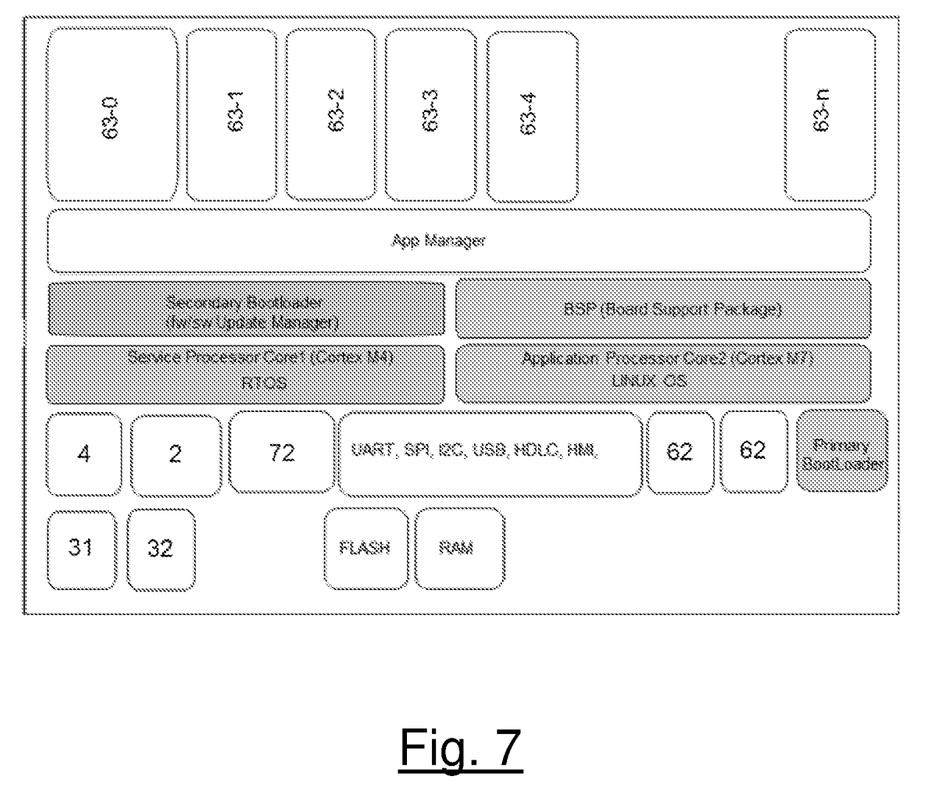
FIG. 7 shows a block diagram of the architecture of the on-board unit according to an embodiment of the present invention.

FIG. 7 shows in schematic form the architecture of the on-board unit 1 according to an embodiment of the present invention. The architecture has the following components:
- a plurality of software applications which comprise the application for providing the automatic toll collection service 63-0, plus a number n of additional applications 63-1, 63-2, . . . 63-n for providing the additional services supported by the on-board unit 1;
- an app manager, namely a basic software module which presents APIs (Application Programming Interfaces) which allow the development of applications which provide the additional services;
- a secondary bootloader (fw/sw update manager), namely a software module which manages the software updates of the on-board unit 1, which the on-board unit 1 may for example receive via its mobile connectivity;
- a BSP (Board Support Package), namely a software module which presents APIs (Application Programming Interfaces) which allow the various peripherals of the on-board unit 1 to be used;
- a service processor, namely a microprocessor which controls the power supply, any inertial sensors, proximity communications modules 4, light indicators 71 and pushbuttons 74, 75; and
- an application processor, namely a microprocessor which contains all the applications 63-0, 63-1, . . . 63-n and which manages mainly the audio module 3, the mobile connectivity and the geolocation engine 62.

Advantageously, therefore, owing to the proximity communications module 4, the user interface 50 of the external user device 5 basically acts as a user interface 50 of the on-board unit 1. This advantageously allows the user to interact more efficiently and easily with the on-board unit 1, essentially without resulting in any increase in the cost of the on-board unit 1 itself.

The user may in fact interact with (namely receive information from and issue commands to) the on-board unit 1 via the interface of his/her user device 5, such as a personal smartphone or tablet. These devices are typically provided with relatively large size screens able to present contents of various types (not only text) and of a certain complexity. They also offer ways for inputting information and commands (typically via a touchscreen) which are extremely simple to use and familiar for the user. The user may thus issue to the on-board unit 1 a wide range of commands via the user interface 50 of his/her personal device, in a simple and easy manner, irrespective as to the position of the on-board unit inside the vehicle. Moreover, the user may receive from the on-board unit 1 complex information and display it on the user interface 50 of his/her user device 5 in a format (size and form) which may be immediately read. On the other hand, the fact of not having to provide the on-board unit 1 essentially with any associated user interface (display, etc.) advantageously allows the cost, the dimensions and the risk of faults to be limited.

The invention claimed is:

1. A system comprising:
an on-board unit for providing an automatic toll collection service, the on-board unit being a portable device removably fixable inside a vehicle,
an external user device which is external to the on-board unit and which comprises a user interface, the external user device executing an external user device software application,
wherein said on-board unit comprises:
a data processing unit which executes:
an on-board unit first software application for providing said automatic toll collection service; and
at least one on-board unit second software application for providing at least one service additional too said automatic toll collection service;
a radio frequency communication module suitable for communicating with at least one road-side device of a system suitable for providing said automatic toll collection; and
a proximity communications module suitable for communicating with said external user device,
wherein said external user device software application is configured to provide a user of said external user device, via said user interface and said proximity communications module, with access to said at least one service additional too said automatic toll collection service provided by said at least one on-board unit second software application;
wherein said external user device software application is configured to provide said user of said external user device with information relating to the functional state of said on-board unit via said user interface of said external user device, wherein the information relating to the functional state of said on-board unit comprises:
first information indicative of a first functional state in which
the on-board unit is powered but the contractual state in a given toll collection domain is not in order, or
the on-board unit is subjected to malfunctions which do not allow compliance with rules of a toll collection domain where it is situated; and
second information indicative of a second functional state in which the on-board unit is powered and the on-board unit is in contractual and technical order for providing the automatic toll collection service in the toll collection domain where it is situated.

2. The system according to claim 1, wherein said on-board unit also comprises an audio module comprising at least one microphone and at least one speaker, said on-board unit being configured to receive at least one voice command via said at least one microphone and to provide information via said at least one speaker, said audio module being suitable for being activated upon detection of a predefined vocal expression.

3. The system according to claim 2, wherein said on-board unit is also provided with mobile connectivity for connection to at least one remote apparatus suitable for supporting the provision of said automatic toll collection service, or of a digital assistant function, or of said at least one additional to said automatic toll collection service.

4. The system according to claim 1, wherein said on-board unit further comprises a power supply circuit in turn comprising:
a battery suitable for providing a predefined supply voltage;
an external power supply unit configured to receive an external power supply voltage via a port of said on-board unit, said external power supply unit being configured to convert said external power supply voltage into said predefined supply voltage; and
a power supply management unit configured to manage use of said battery and of said external power supply unit for supplying said on-board unit and to manage the recharging of said battery.

5. The system according to claim 4, wherein said power supply circuit further comprises a solar panel configured to recharge said battery.

6. The system according to claim 1, wherein said on-board unit further comprises a geolocation engine suitable for determining the geographical position of said on-board unit by interacting with one or more satellite geolocation systems.

7. The system according to claim 1, wherein said on-board unit further comprises one or more light indicators suitable for providing indications to the user of said on-board unit.

8. The system according to claim 1, wherein said on-board unit further comprises a low-frequency communication module.

9. The system according to claim 1, wherein said on-board unit further comprises one or more pushbuttons for allowing the user to issue at least one command to said on-board unit, said one or more pushbuttons comprising at least one service button adapted to activate said proximity communications module so that it connects to said external user device.

10. The system according to claim 1, wherein said on-board unit comprises an external housing, said external housing having a width of between 80 mm and 100 mm, a height of between 60 mm and 70 mm and a thickness of between 20 mm and 30 mm.

11. The system according to claim 1, wherein said proximity communications module is provided with a real-time operating system.

12. The system according to claim 1, wherein said external user device software application is configured to provide, to the user of said external user device via said user interface, information descriptive of the vehicle for automatic toll collection purposes used by the on-board unit first software application in communicating with said automatic toll collection service, the information descriptive of the vehicle for automatic toll collection purposes comprising one or more of:
a weight class of the vehicle; and
a number of axles of the vehicle.

13. The system according to claim 1, wherein said external user device software application is configured to receive, from the user of said external user device via said user interface, information descriptive of the vehicle for automatic toll collection purposes for use by the on-board unit first software application in communicating with the automatic toll collection service, the information descriptive of the vehicle for automatic toll collection purposes comprising one or more of:
  a weight class of the vehicle; and
  a number of axles of the vehicle.

14. The system according to claim 1, wherein said external user device software application is configured to receive information from the user of the external user device via said user interface, and to provide to the on-board unit first software application of the on-board unit, changed information for automatic toll collection purposes, the changed information comprising a changed license number plate of the vehicle.

15. The system according to claim 1, wherein the information relating to the functional state of said on-board unit further comprises one or more of the following: connectivity to a toll collection domain; connectivity to a mobile network; and connectivity to a geolocation satellite.

16. The system according to claim 1, wherein the information relating to the functional state of said on-board unit further comprises one or more of the following: power status of the on-board unit; and fault of the on-board unit.

17. The system according to claim 1, wherein the on-board unit is configured to be adhered to a windscreen of the vehicle.

18. The system according to claim 1, wherein the external user device comprises a smartphone or a tablet.

19. An on-board unit for providing an automatic toll collection service, the on-board unit being a portable device removably fixable inside a vehicle, the on-board unit comprising:

data processing unit which executes:
  an on-board unit first software application for providing said automatic toll collection service; and
  at least one on-board unit second software application for providing at least one service additional too said automatic toll collection service;
a radio frequency communication module suitable for communicating with at least one road-side device of a system suitable for providing said automatic toll collection; and
a proximity communications module suitable for communicating with an external user device which is external to the on-board unit,
wherein through the proximity communications module the on-board unit provides the external user device with information relating to a functional state of said on-board unit, and wherein the information relating to the functional state of said on-board unit comprises:
  first information indicative of a first functional state in which the on-board unit is powered but the contractual state in a given toll collection domain is not in order, or the on-board unit is subjected to malfunctions which do not allow compliance with rules of a toll collection domain where it is situated; and
second information indicative of a second functional state in which the on-board unit is powered and the on-board unit is in contractual and technical order for providing the automatic toll collection service in the toll collection domain where it is situated.

* * * * *